US010284041B2

(12) United States Patent
Tamaki et al.

(10) Patent No.: US 10,284,041 B2
(45) Date of Patent: May 7, 2019

(54) STATOR OF MOTOR HAVING INSULATING STRUCTURE (71) Applicant: FANUC CORPORATION, Yamanashi (JP)

(72) Inventors: Takeshi Tamaki, Tamanashi (JP); Kouji Kobayashi, Yamanashi (JP); Koutarou Yamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 100 days.

(21) Appl. No.: 15/486,701

(22) Filed: Apr. 13, 2017

(65) Prior Publication Data
US 2017/0302118 A1    Oct. 19, 2017

(30) Foreign Application Priority Data

Apr. 14, 2016  (JP) .................................. 2016-080873

(51) Int. Cl.
H02K 3/34         (2006.01)
H02K 3/32         (2006.01)
(Continued)

(52) U.S. Cl.
CPC ............ H02K 3/325 (2013.01); H02K 1/146 (2013.01); H02K 1/187 (2013.01); H02K 3/52 (2013.01);
(Continued)

(58) Field of Classification Search
CPC ............ H02K 1/00; H02K 1/14; H02K 1/146; H02K 1/148; H02K 1/18; H02K 1/187;
(Continued)

(56) References Cited

U.S. PATENT DOCUMENTS 4,912,353 A * 3/1990 Kondo .................. H02K 1/148
                                                                310/216.067
6,081,059 A * 6/2000 Hsu ........................ H02K 1/148
                                                                  29/596
(Continued)

FOREIGN PATENT DOCUMENTS

JP      H05-292709 A    11/1993
JP      H09-182342 A     7/1997
(Continued)

OTHER PUBLICATIONS

An Office Action mailed by the Japanese Patent Office dated Apr. 3, 2018, which corresponds to Japanese Patent Application No. 2016-080873 and is related to U.S. Appl. No. 15/486,701.

Primary Examiner — Tran N Nguyen
(74) Attorney, Agent, or Firm — Studebaker & Brackett PC (57) ABSTRACT To provide a stator of a motor having an insulating structure achieving insulation easily and reliably. A stator (1) of a motor comprises: a teeth unit (11) with a circular cylindrical part (111) having a circular cylindrical shape and multiple projection parts (112) spaced uniformly along an outer circumference of the circular cylindrical part (111) in a circumferential direction of the circular cylindrical part (111), the projection parts (112) projecting radially outwardly from the circular cylindrical part (111); multiple bobbins (13) having cylindrical shapes with hollow sections (133) through which the projection parts (112) of the teeth unit (11) are passed to be fitted in the hollow sections (133), the bobbins (13) having outer peripheries around which windings (14) are wound; a cylindrical external unit (12) arranged radially outside the teeth unit (11) and fitted to an outer circumference of the teeth unit (11) and the outer peripheries of the bobbins (13); and multiple first insulating parts (15) arranged to fill gaps between the circular cylin-
(Continued)

drical part (111) of the teeth unit (11) and the bobbins (13) and electrically insulating the teeth unit (11) and the windings (14).

6 Claims, 11 Drawing Sheets

(51) Int. Cl.
*H02K 1/14* (2006.01)
*H02K 1/18* (2006.01)
*H02K 3/52* (2006.01)
*H02K 15/12* (2006.01)

(52) U.S. Cl.
CPC ............. *H02K 3/522* (2013.01); *H02K 1/148* (2013.01); *H02K 3/345* (2013.01); *H02K 15/12* (2013.01); *H02K 2203/12* (2013.01)

(58) Field of Classification Search
CPC .. H02K 3/00; H02K 3/30; H02K 3/32; H02K 3/325; H02K 3/34; H02K 3/345; H02K 3/52
See application file for complete search history.

(56) References Cited

U.S. PATENT DOCUMENTS

| | | | | |
|---|---|---|---|---|
| 2010/0156204 A1* | 6/2010 | Endo | ........................ | H02K 3/522 310/44 |
| 2010/0207482 A1* | 8/2010 | Kim | .......................... | H02K 1/16 310/215 |
| 2012/0275942 A1* | 11/2012 | Knapp | .................... | H02K 1/165 417/423.3 |
| 2013/0313939 A1* | 11/2013 | Hiramitsu | ................. | H02K 3/34 310/195 |

FOREIGN PATENT DOCUMENTS

| | | | |
|---|---|---|---|
| JP | 2000-333399 A | | 11/2000 |
| JP | 2008-043020 A | | 2/2008 |
| JP | 2008043020 A | * | 2/2008 |
| JP | 5297364 B2 | | 9/2013 |
| JP | 2015133810 A | * | 7/2015 |

* cited by examiner

STATOR OF MOTOR HAVING INSULATING STRUCTURE

This application is based on and claims the benefit of priority from Japanese Patent Application No. 2016-080873, filed on 14 Apr. 2016, the content of which is incorporated herein by reference.

BACKGROUND OF THE INVENTION

Field of the Invention

The present invention relates to a stator of a motor having an insulating structure.

Related Art

In motors used in various industrial devices in recent years, windings attached to stators have been arranged more densely for purposes of further size reduction and higher performance. However, densely arranging the windings causes the risk of contact of a winding with a teeth unit, or contact between adjacent windings of different phases.

Hence, a stator has been required to have improved insulating properties in terms of safety. In this regard, various stators having insulating structures have been suggested (see patent document 1 and patent document 2, for example). Patent documents 1 and 2 recite that the insulating properties of a stator can be improved by inserting insulating paper or an insulating plate between a winding and a teeth unit, or between the phases of windings.

Patent Document 1: Japanese Unexamined Patent Application, Publication No. 2000-333399

Patent Document 2: Japanese Patent No. 5297364

SUMMARY OF THE INVENTION

However, a conventional stator has a required troublesome process of inserting insulating paper or an insulating plate between a winding and a teeth unit or between the phases of windings requires a large amount man-hours.

A molded stator split into a teeth unit and an external unit covering the outer periphery of the teeth unit is manufactured by injection molding. This has caused a problem in the conventional stator in that application of injection pressure during injection molding moves a winding to deviate the winding from its position, or deforms insulating paper, for example. This causes the risk of insulation failure due to contact between a winding and the teeth unit, or contact between windings of different phases.

The present invention has been made in view of the above-described circumstances. The present invention is intended to provide a stator of a motor having an insulating structure, achieving insulation easily and reliably.

(1) A stator (a stator 1 described later, for example) of a motor according to the present invention comprises: a teeth unit (a teeth unit 11 described later, for example) with a circular cylindrical part (a circular cylindrical part 111 described later, for example) having a circular cylindrical shape and multiple projection parts (projection parts 112 described later, for example) spaced uniformly along an outer circumference of the circular cylindrical part in a circumferential direction of the circular cylindrical part, the projection parts projecting radially outwardly from the circular cylindrical part; multiple bobbins (bobbins 13 described later, for example) having cylindrical shapes with hollow sections (hollow sections 133 described later, for example) through which the projection parts of the teeth unit are passed to be fitted in the hollow sections, the bobbins having outer peripheries around which windings (windings 14 described later, for example) are wound; a cylindrical external unit (an external unit 12 described later, for example) arranged radially outside the teeth unit, and fitted to an outer circumference of the teeth unit and the outer peripheries of the bobbins; and multiple first insulating parts (first insulating parts 15 described later, for example) arranged to fill gaps between the circular cylindrical part of the teeth unit and the bobbins, and electrically insulating the teeth unit and the windings.

(2) In the stator of a motor described in (1), the multiple first insulating parts may be integrated with the teeth unit.

(3) In the stator of a motor described in (1) or (2), the stator may further comprise multiple second insulating parts (interphase insulating parts 161 described later, for example) each arranged to be fitted in a gap (a gap C, Ca, or Cb described later, for example) formed between adjacent ones of the bobbins, and electrically insulating windings of different phases wound around the adjacent bobbins.

(4) In the stator of a motor described in (3), the multiple second insulating parts may be integrated.

The present invention is capable of providing a stator of a motor having an insulating structure achieving insulation easily and reliably.

DETAILED DESCRIPTION OF THE INVENTION

Embodiments of the present invention will be described below in detail by referring to the drawings. In the description of a second embodiment, configurations common to those of a first embodiment will be given the same signs and explanations of such configurations will be omitted.

[First Embodiment]

Figure 1:
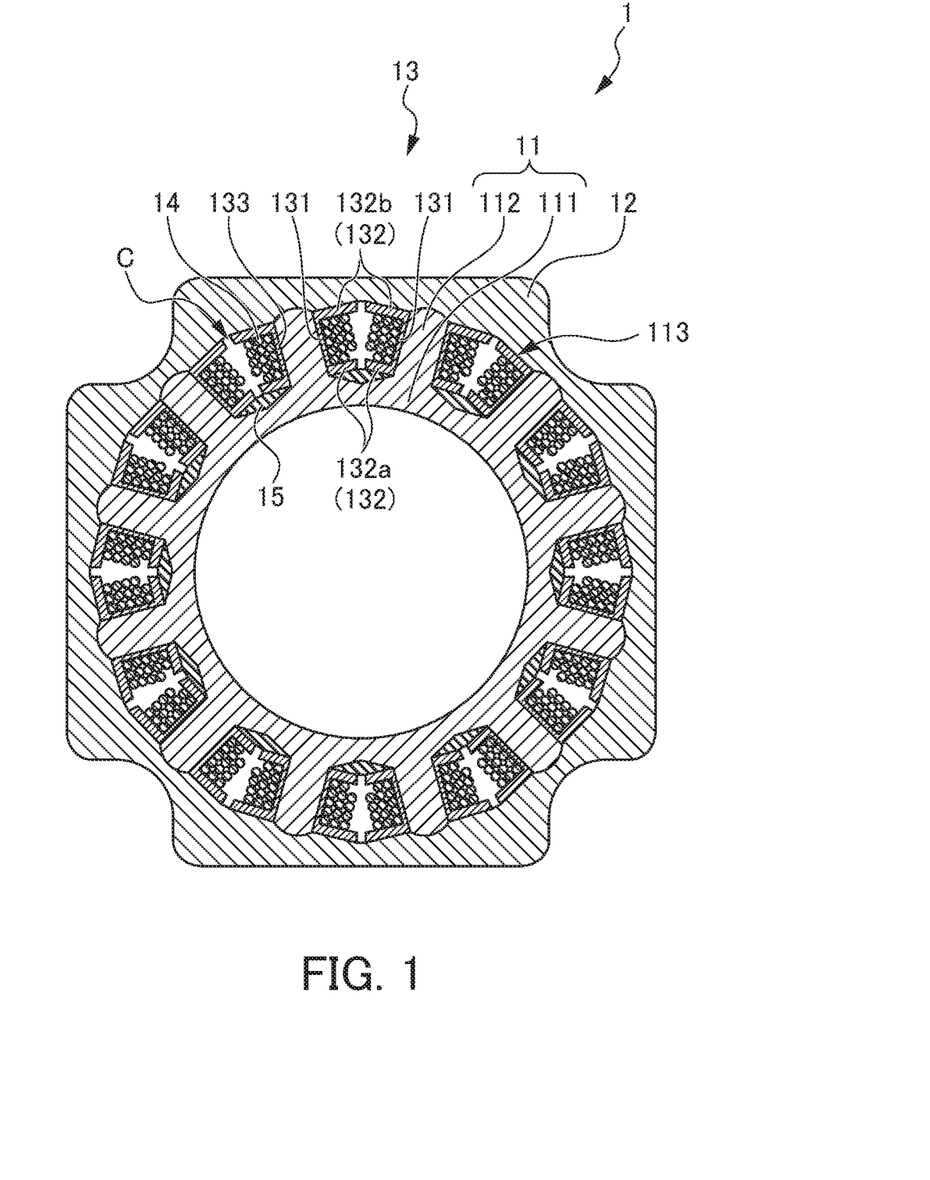
FIG. 1 is a radially-taken sectional view of a stator according to a first embodiment.
Figure 2:
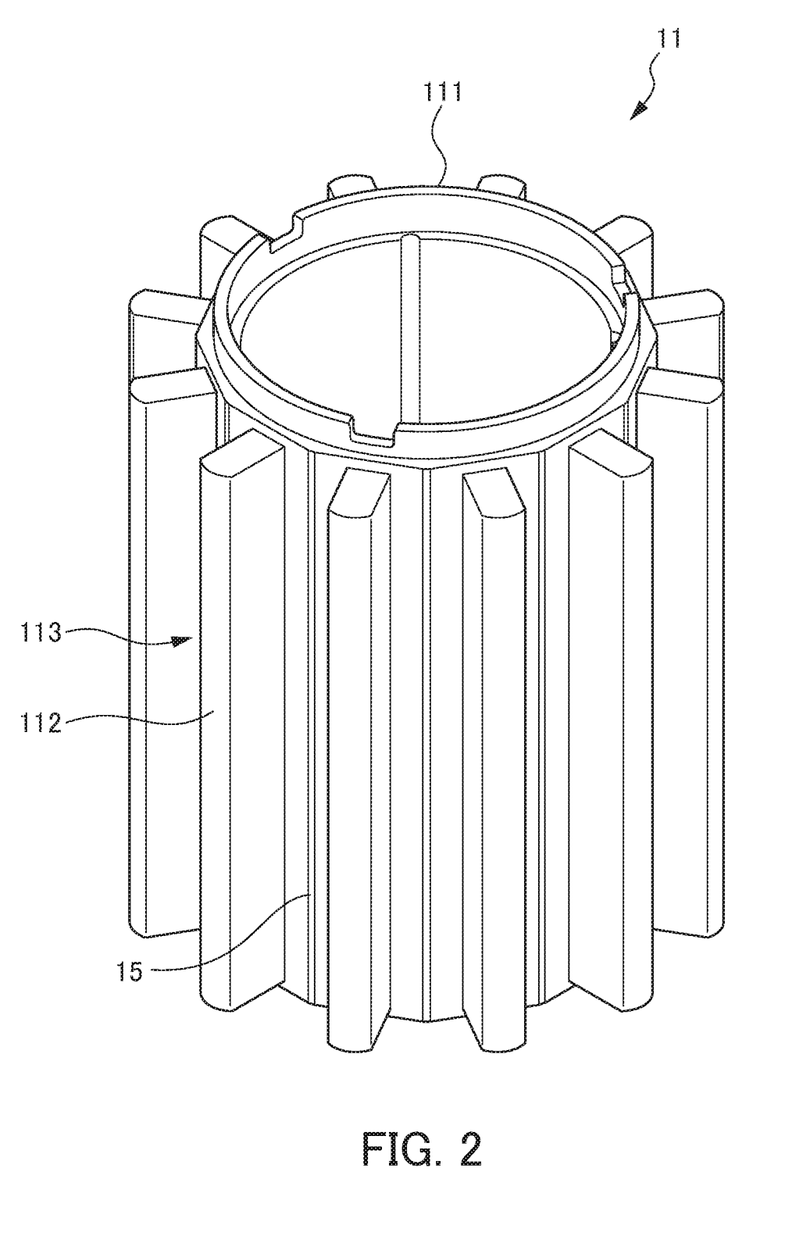
FIG. 2 is a perspective view of a teeth unit of the stator according to the first embodiment.
Figure 3:
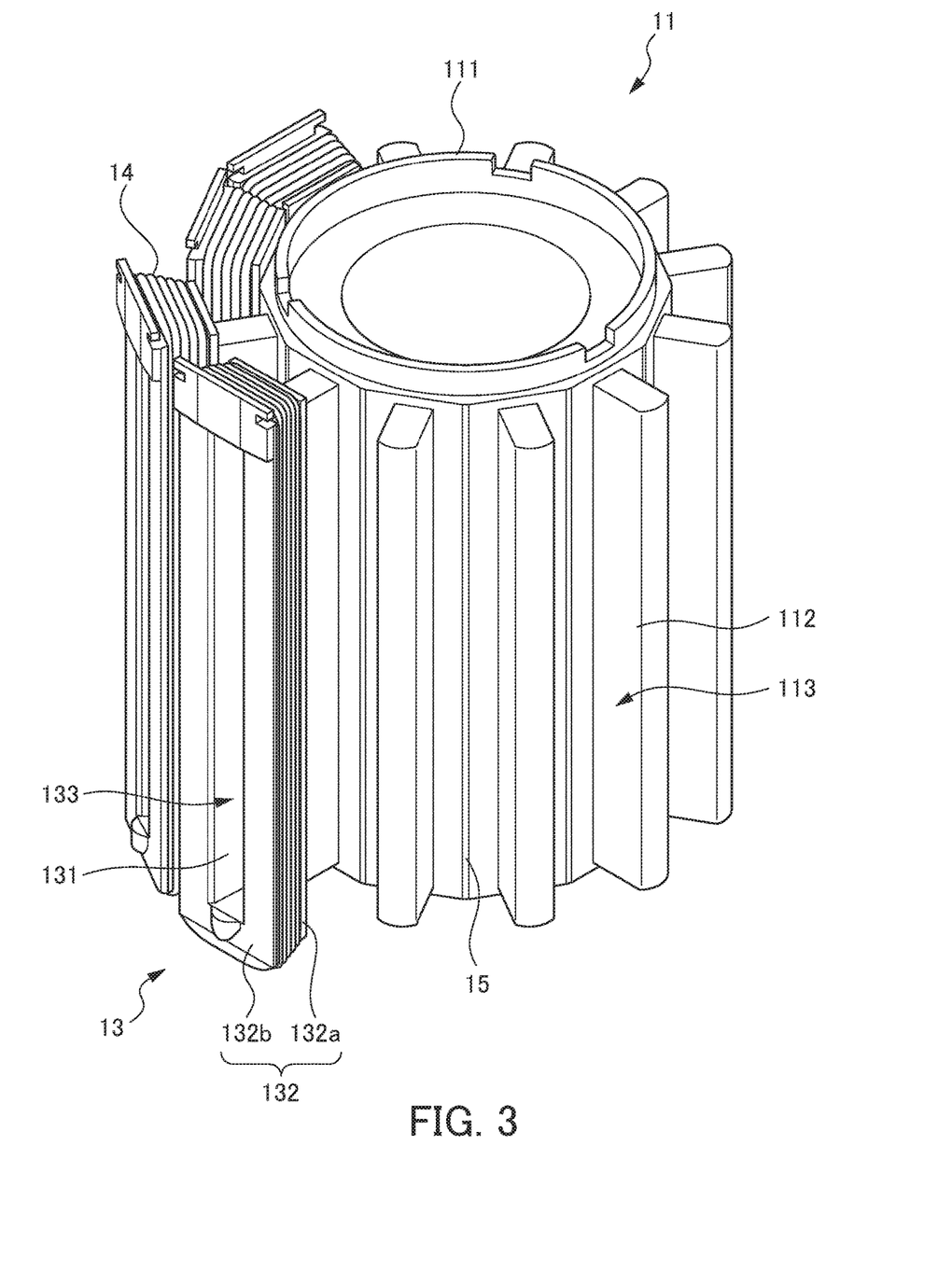
FIG. 3 is an exploded perspective view of the stator according to the first embodiment.

FIG. 1 is a radially-taken sectional view of a stator 1 according to the first embodiment of the present invention. FIG. 2 is a perspective view of a teeth unit 11 of the stator 1 according to the first embodiment. FIG. 3 is an exploded perspective view of the stator 1 according to the first embodiment. Illustration of an external unit 12 is omitted from FIG. 3.

Both the stator 1 according to this embodiment and a rotor not shown in the drawings are components of a motor. As shown in FIGS. 1 to 3, the stator 1 of the motor according to this embodiment is a molded stator split into the teeth unit 11 and the external unit 12.

The teeth unit 11 is formed by laminating multiple magnetic steel plates in the axis direction of the stator 1. The teeth unit 11 includes a circular cylindrical part 111 and multiple projection parts 112. By the presence of the circular cylindrical part 111 and the projection parts 112, multiple slots 113 are formed in a circumferential direction.

The circular cylindrical part 111 has a circular cylindrical shape and is arranged at a radially inside position of the stator 1. The rotor not shown in the drawings is rotatably arranged in a hollow section of the circular cylindrical part 111. The projection part 112 is formed to project radially outwardly from the circular cylindrical part 111. The projection part 112 includes multiple projection parts 112 spaced uniformly in the circumferential direction of the circular cylindrical part 111. All the projection parts 112 extend from one end toward an opposite end of the stator 1 in the axis direction of the stator 1. The projection part 112 has a shape to be fitted in a hollow section of a bobbin 13 described later.

The external unit 12 is provided to cover the outer circumference of the teeth unit 11. The external unit 12 forms an external section of the stator 1. Like the teeth unit 11, the external unit 12 is formed by laminating multiple magnetic steel plates in the axis direction of the stator 1. As described above, the stator 1 according to this embodiment is a molded stator. Resin is poured into the slot 113 surrounded by the external unit 12 and the teeth unit 11 from the axis direction of the stator 1. As shown in FIG. 1, the external unit 12 according to this embodiment has a substantially square shape in a radially-taken sectional view, with all the corners cut out into semi-circular shapes. However, this is not the only shape of the external unit 12.

The stator 1 includes the bobbin 13, a winding 14, and a first insulating part 15.

The bobbin 13 includes a rectangular cylindrical part 131 of a substantially rectangular cylindrical shape, and a pair of rectangular plate parts 132 like flanges provided at opposite ends of the rectangular cylindrical part 131, and extending in the axis direction of the rectangular cylindrical part 131. The projection part 112 of the teeth unit 11 is passed through the hollow section 133 of the rectangular cylindrical part 131 to be fitted in the hollow section 133. In this way, multiple bobbins 13 are arranged on the outer circumference of the teeth unit 11. A radially-extending gap C is formed between bobbins 13 adjacent to each other in the circumferential direction.

The pair of rectangular plate parts 132 includes an inner rectangular plate part 132a arranged at a radially inside position, and an outer rectangular plate part 132b arranged at a radially outside position. Each of the inner rectangular plate part 132a and the outer rectangular plate part 132b has a substantially rectangular annular shape. The outer rectangular plate part 132b is formed into a width dimension larger than that of the inner rectangular plate part 132a. In this way, the bobbins 13 are allowed to be arranged densely in the circumferential direction along the outer circumference of the teeth unit 11. The gap C between adjacent bobbins 13 is defined by a gap Ca formed between adjacent inner rectangular plate parts 132a, and a gap Cb formed between adjacent outer rectangular plate parts 132b.

As described above, the projection part 112 of the teeth unit 11 is passed through the hollow section 133 of the rectangular cylindrical part 131 to be fitted in the hollow section 133. The winding 14 is wound a given number of turns along the outer periphery of the rectangular cylindrical part 131. In this way, the winding 14 is arranged in the slot 113.

The winding 14 wound along the outer periphery of the rectangular cylindrical part 131 of the bobbin 13 is arranged to extend in the axis direction of the stator 1. Windings 14 adjacent to each other in the circumferential direction have different phases. The winding 14 has one end connected to one end of a different winding 14, and an opposite end routed to a wiring board connected to a power connector not shown in the drawings, thereby forming a three-phase connection.

The first insulating part 15 is arranged to fill a gap between the circular cylindrical part 111 of the teeth unit 11 and the bobbin 13. In a conventional stator, a gap is formed between a circular cylindrical part of a teeth unit and a bobbin. By contrast, according to this embodiment, the first insulating part 15 is arranged to fill this gap. In this way, the first insulating part 15 is fitted between the circular cylindrical part 111 of the teeth unit 11 and the bobbin 13.

The first insulating part 15 is formed of an electrically-insulating member. This forms electrical insulation between the teeth unit 11 and the winding 14. According to this embodiment, the first insulating part 15 has a substantially rhombic shape in a radially-taken section view, and extends in the axis direction of the stator 1.

The first insulating part 15 according to this embodiment is formed integrally with the teeth unit 11 by insert molding of the teeth unit 11 during injection molding. Specifically, the first insulating part 15 is formed by injection molding.

The following describes the working effect achieved by the stator 1 according to this embodiment in detail by making comparison to conventional stators.

Figure 8:
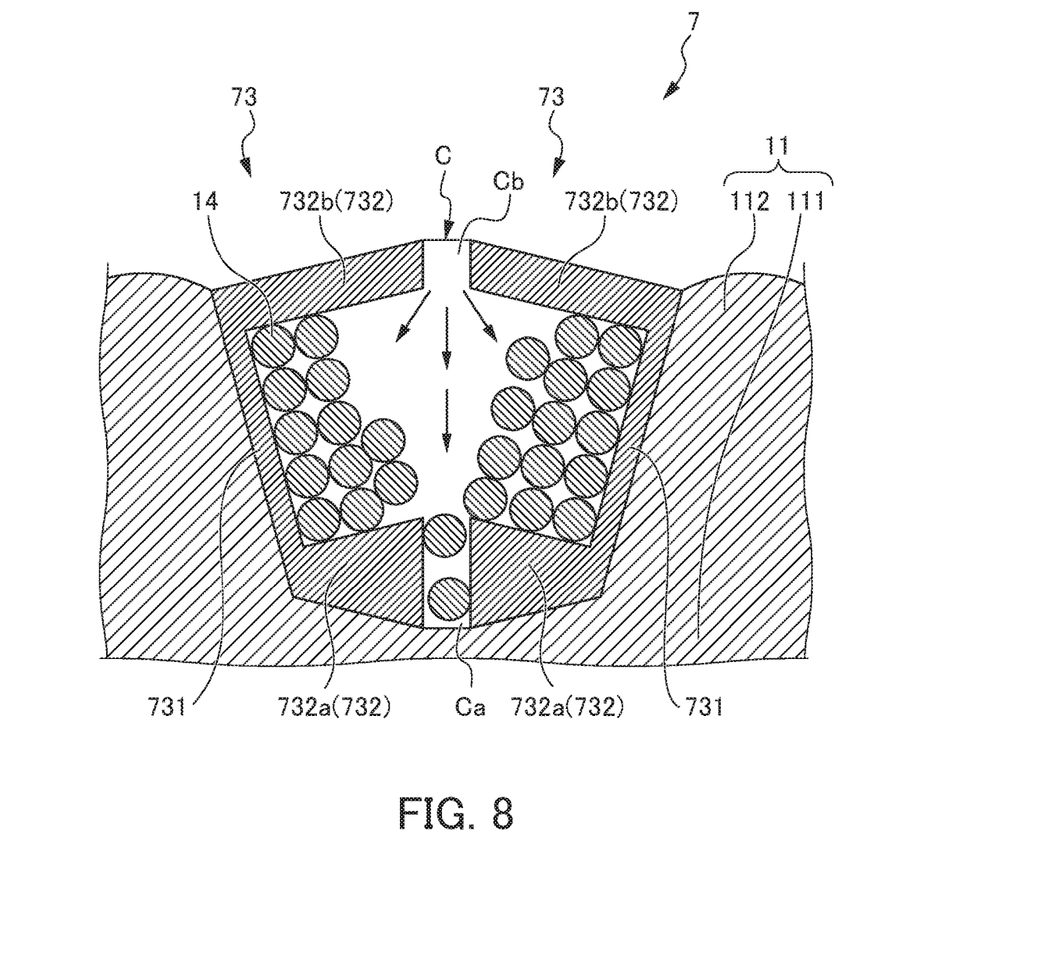
FIG. 8 explains a stator according to a first conventional example.

FIG. 8 explains a stator 7 according to a first conventional example. More specifically, FIG. 8 shows the winding 14 and its surrounding in a radially-taken sectional view of the stator 7. As shown in FIG. 8, in the stator 7 according to the first conventional example, the gap C formed between bobbins 73, 73 adjacent to each other in the circumferential direction extends to the circular cylindrical part 111 of the teeth unit 11. Specifically, a radially inside surface of the bobbin 73 abuts on the outer circumferential surface of the circular cylindrical part 111. An insulating member such as insulating paper is not arranged between the radially inside surface of the bobbin 73 and the outer circumferential surface of the circular cylindrical part 111. In the stator 7, resin is poured in under high injection pressure during injection molding from a wide gap (gap Cb) at a radially outside position toward a narrow gap (gap Ca) at a radially inside position, as shown by arrows in FIG. 8. Then, the winding 14 is moved toward the gap Ca at the radially inside position by the resin poured in to pass through the gap Ca, thereby causing the risk of contact of the resin with the circular cylindrical part 111 of the teeth unit 11.

Figure 9:
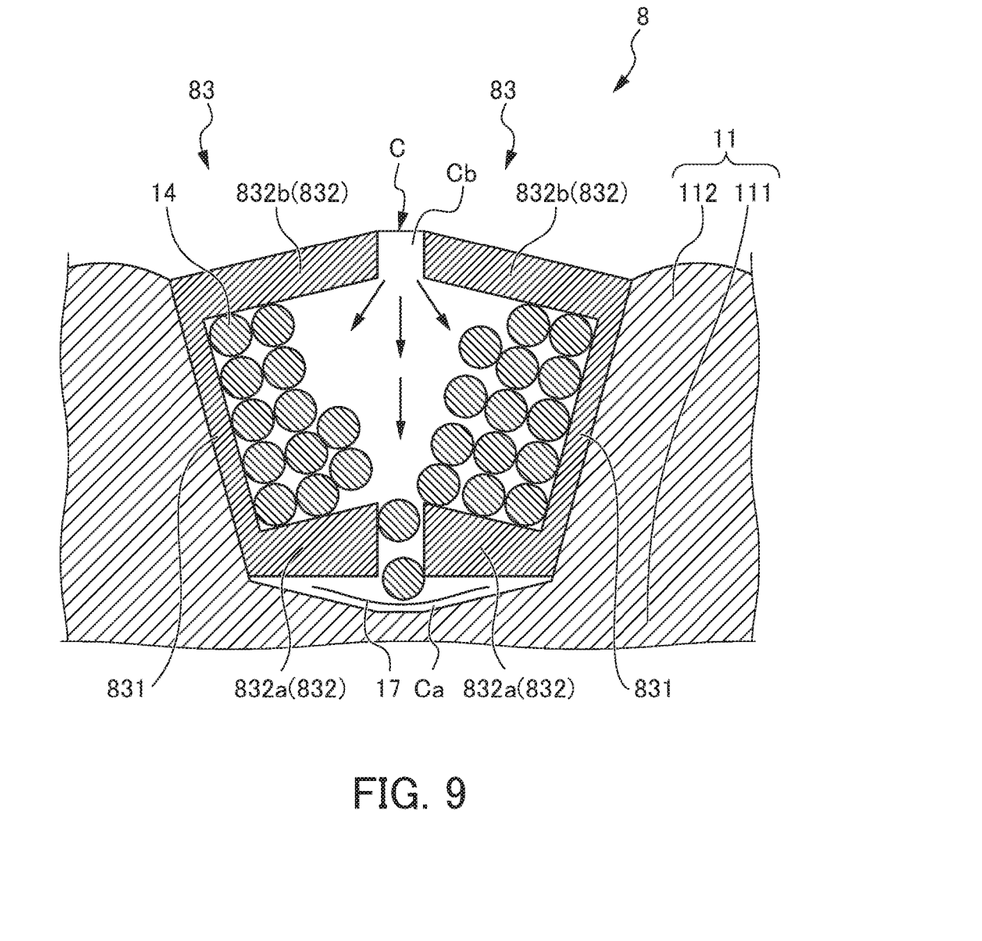
FIG. 9 explains a stator according to a second conventional example.

FIG. 9 explains a stator 8 according to a second conventional example. More specifically, FIG. 9 shows the winding 14 and its surrounding in a radially-taken sectional view of the stator 8. As shown in FIG. 9, in the stator 8 according to the second conventional example, a gap is formed between a radially inside surface of a bobbin 83 and the outer circumferential surface of the circular cylindrical part 111 of the teeth unit 11. Insulating paper 17 is arranged in the gap to extend along the outer circumferential surface of the circular cylindrical part 111. Thus, even if the winding 14 is moved to the gap Ca by application of injection pressure, the presence of the insulating paper 17 prevents the winding 14 from reaching the circular cylindrical part 111 of the teeth unit 11, thereby ensuring insulating properties.

However, when using the stator 8 according to the second conventional example, the low rigidity of the insulating paper 17 causes the insertion of the insulating paper 17 into the gap to become a difficult and complicated process. This creates a problem in that a large amount of man-hours are required. Additionally, difficulty in inserting the insulating paper 17 causes the risk of failing to arrange the insulating paper 17 at a proper position. In this case, insulation failure might occur.

Figure 10:
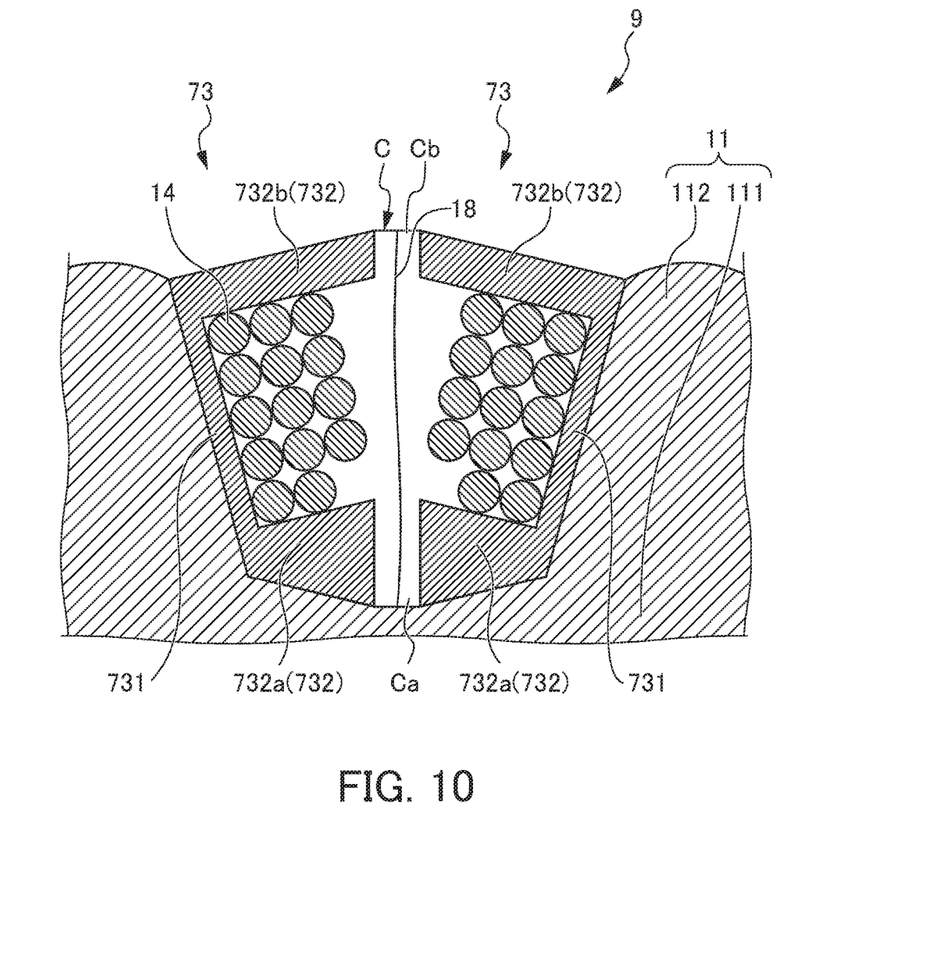
FIG. 10 explains a stator according to a third conventional example.
Figure 11:
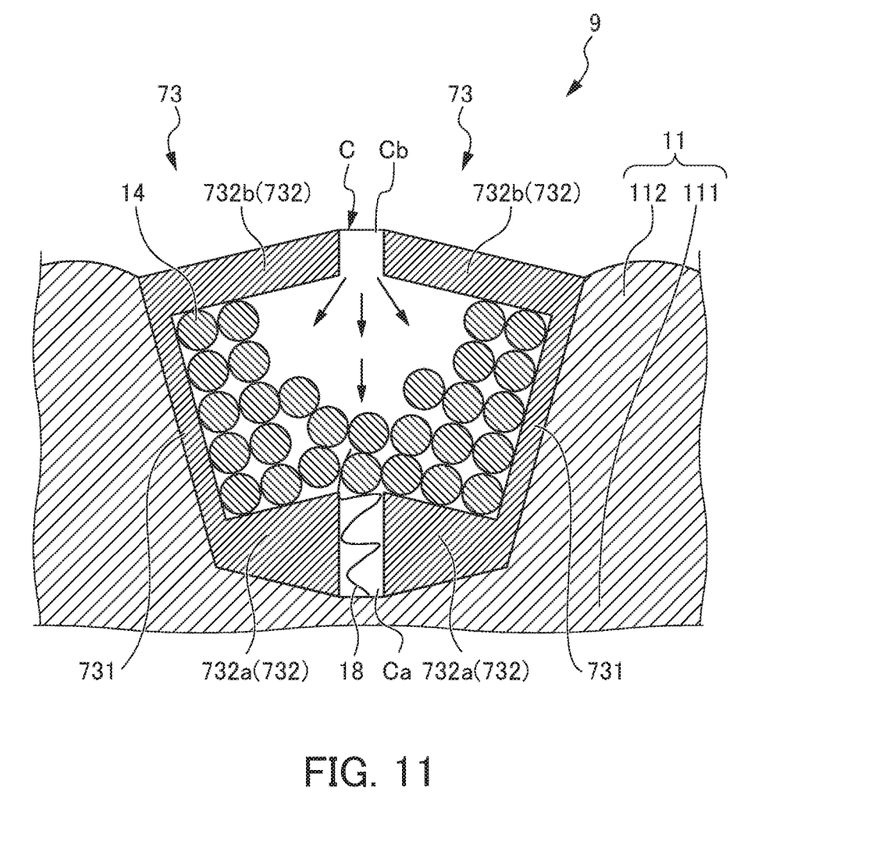
FIG. 11 explains the stator according to the third conventional example.

FIGS. 10 and 11 explain a stator 9 according to a third conventional example. More specifically, FIGS. 10 and 11 show the winding 14 and its surrounding in a radially-taken sectional view of the stator 9. FIG. 10 shows a state before injection molding. FIG. 11 shows a state during injection molding. As shown in FIG. 10, in the stator 9 according to the third conventional example, the gap C is formed between the bobbins 73, 73 to extend to the circular cylindrical part 111 of the teeth unit 11, like in the above-described first conventional example. Radially-extending insulating paper 18 is arranged in the gap C. The insulating paper 18 extends from the outer circumferential surface of the circular cylindrical part 111 to an outer rectangular plate part 732b of the bobbin 73.

Like in the above-described second conventional example, the stator 9 according to the third conventional example encounters a problem in that large man-hours are required for manufacture. As shown by arrows in FIG. 11, if resin is poured in radially inwardly from the gap Cb at a radially outside position under high injection pressure during injection molding, the insulating paper 18 and the winding 14 are together moved radially inwardly. This causes deformation such as folding of the insulating paper 18, and the deformed insulating paper 18 is shifted toward the circular cylindrical part 111. This causes the risk of insulation failure.

Figure 4:
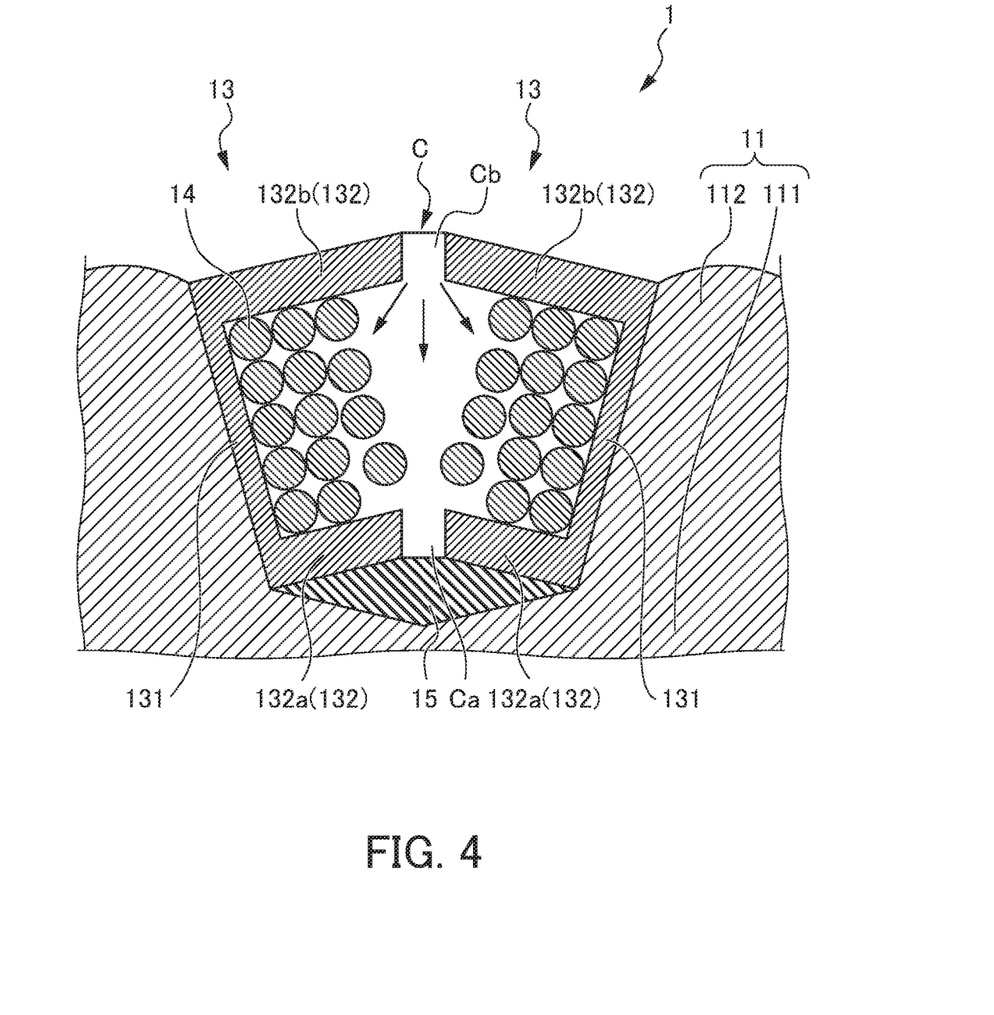
FIG. 4 explains the working effect achieved by the stator according to the first embodiment.

As described above, sufficient insulating properties cannot actually be ensured by any of the conventional examples 1, 2, and 3. By contrast, sufficient insulating properties are ensured in the stator 1 according to this embodiment. FIG. 4 explains the working effect achieved by the stator 1 according to this embodiment. More specifically, FIG. 4 shows the winding 14 and its surrounding in the radially-taken sectional view of the stator 1 shown in FIG. 1.

As shown by arrows in FIG. 4, resin is also poured in radially inwardly from the gap Cb at the radially outside position under high injection pressure during injection molding. Meanwhile, the first insulating part 15 is arranged to be fitted in the gap between a radially inside surface of the bobbin 13 and the outer circumferential surface of the circular cylindrical part 111 of the teeth unit 11 so as to fill this gap. Thus, even if the winding 14 is moved toward the circular cylindrical part 111 by application of the injection pressure, the winding 14 is blocked by the first insulating part 15 and does not reach the teeth unit 11 accordingly. A gap is not formed between the radially inside surface of the bobbin 13 and the outer circumferential surface of the circular cylindrical part 111 of the teeth unit 11. This naturally reduces the amount of resin to be poured into the gap C between the bobbins 13. This also restricts move of the winding 14 to reduce the probability of contact between the windings 14. As a result, high insulating properties are achieved in the stator 1 according to this embodiment.

This embodiment achieves the following effects. According to this embodiment, in the stator 1 including the teeth unit 11 and the external unit 12 as split units, the first insulating part 15 for electrically insulating the teeth unit 11 and the winding 14 is arranged so as to fill the gap between the circular cylindrical part 111 of the teeth unit 11 and the bobbin 13. Thus, as described above, the presence of the first insulating part 15 prevents the winding 14 from contacting the outer circumferential surface of the circular cylindrical part 111 of the teeth unit 11. At the same time, the probability of contact between adjacent windings 14 of different phases is reduced. Thus, the stator 1 according to this embodiment achieves an insulating structure with rigidity having resistance to injection pressure, thereby preventing insulation failure.

According to this embodiment, the multiple first insulating parts 15 are formed integrally with the teeth unit 11. This eliminates the need for insertion of the first insulating parts 15 to achieve significant reduction in man-hours. In particular, the first insulating parts 15 and the teeth unit 11 are integrally formed by insert molding of the teeth unit 11 using injection molding. This achieves the above-described effect more reliably.

[Second Embodiment]

Figure 5:
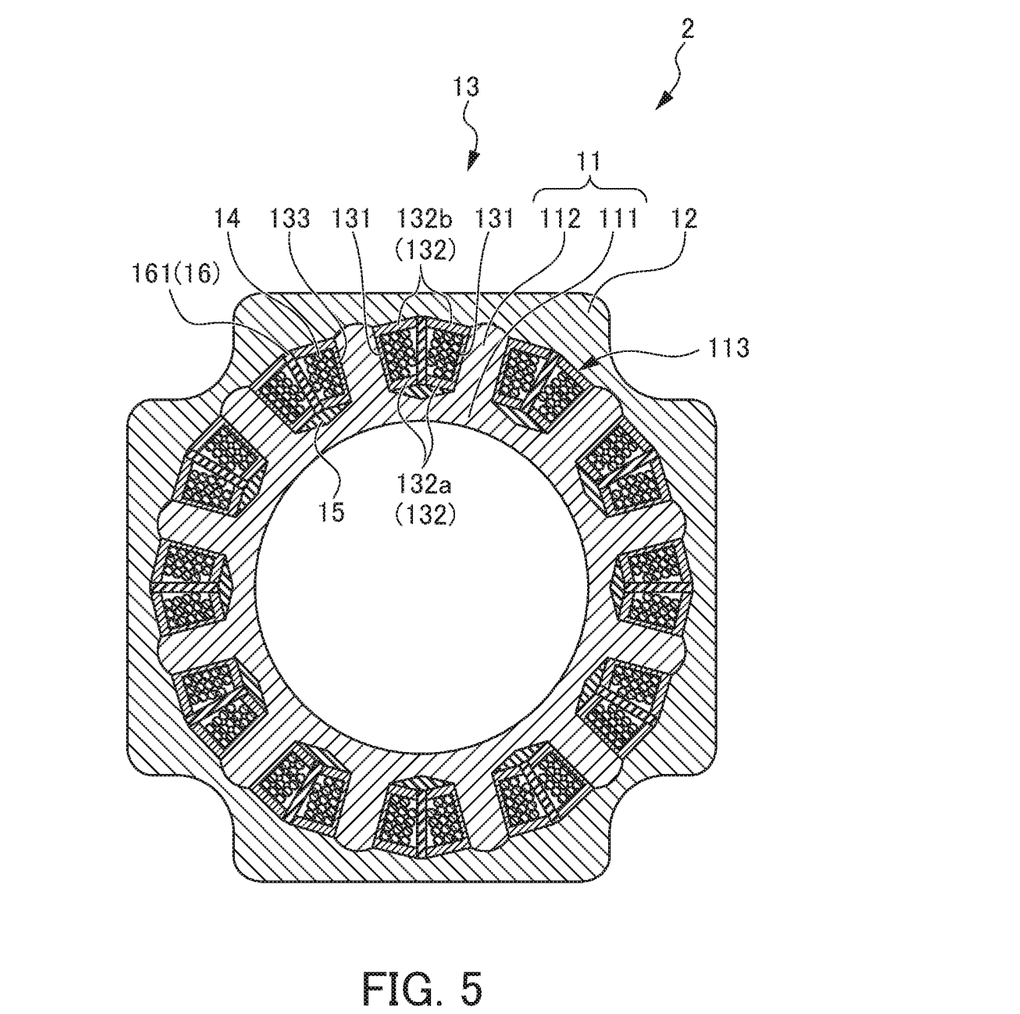
FIG. 5 is a radially-taken sectional view of a stator according to a second embodiment.

FIG. 5 is a radially-taken sectional view of a stator 2 according to the second embodiment. As shown in FIG. 5, the stator 2 according to this embodiment has the same configuration as the stator 1 according to the first embodiment, except that the stator 2 further includes a second insulating member 16.

Figure 6:
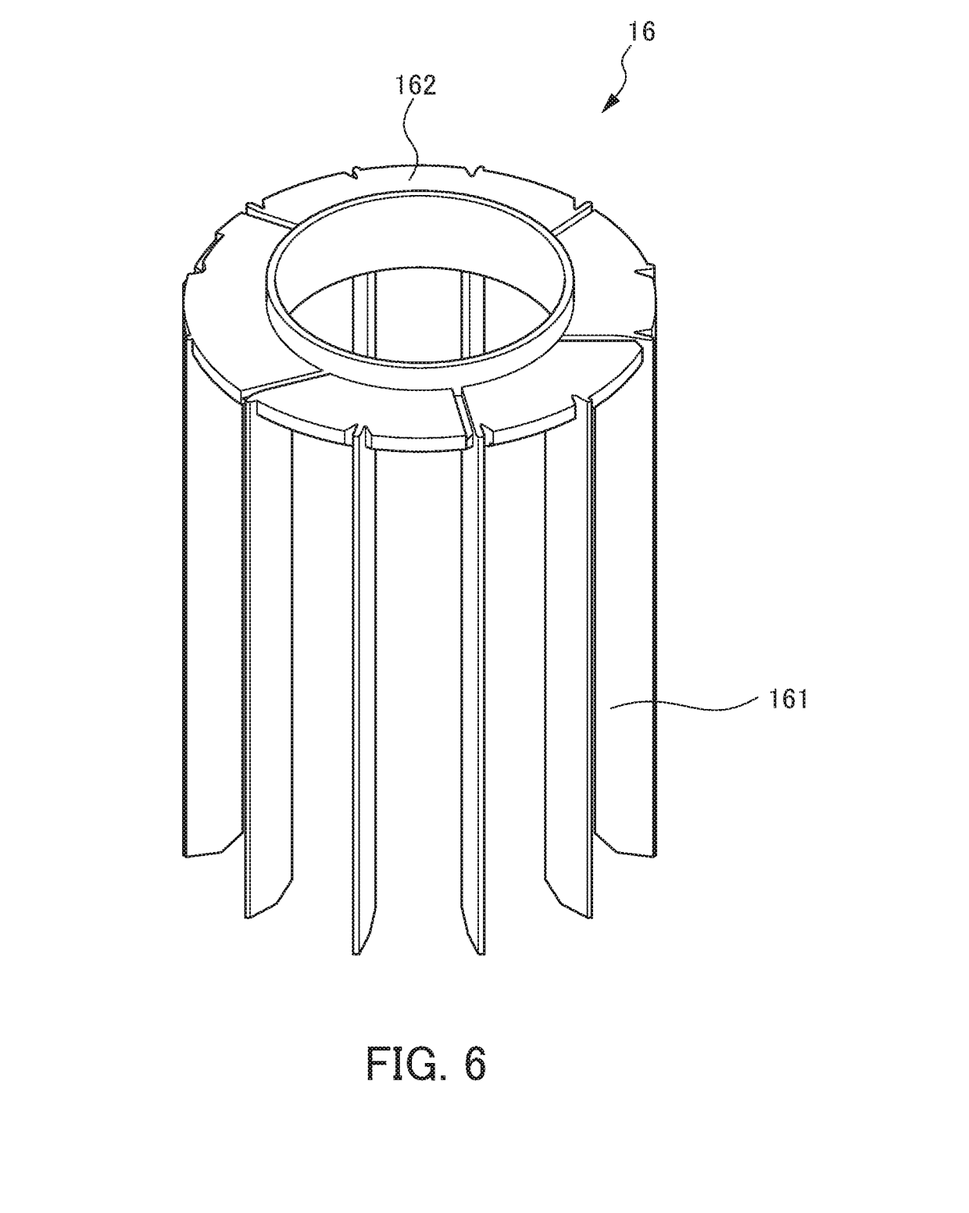
FIG. 6 is a perspective view of a second insulating part of the stator according to the second embodiment.

FIG. 6 is a perspective view of the second insulating member of the stator 2 according to this embodiment. As shown in FIG. 6, the second insulating member 16 includes multiple interphase insulating parts 161 and a coupling part 162. The multiple interphase insulating parts 161 are each fitted in the gap C between adjacent windings 14 of different phases. The interphase insulating part 161 has an elongated rectangular shape in a radially-taken sectional view and extends in the radial direction of the stator 2. The interphase insulating part 161 extends from one end toward an opposite end of the stator 2 in the axis direction of the stator 2. The second insulating member 16 is formed of an electrically-insulating member and forms electrical insulation between windings 14 of different phases.

The coupling part 162 is arranged at one end of the interphase insulating part 161. The coupling part 162 has an annular shape. The multiple interphase insulating parts 161 are coupled to be integrated by the coupling part 162.

Figure 7:
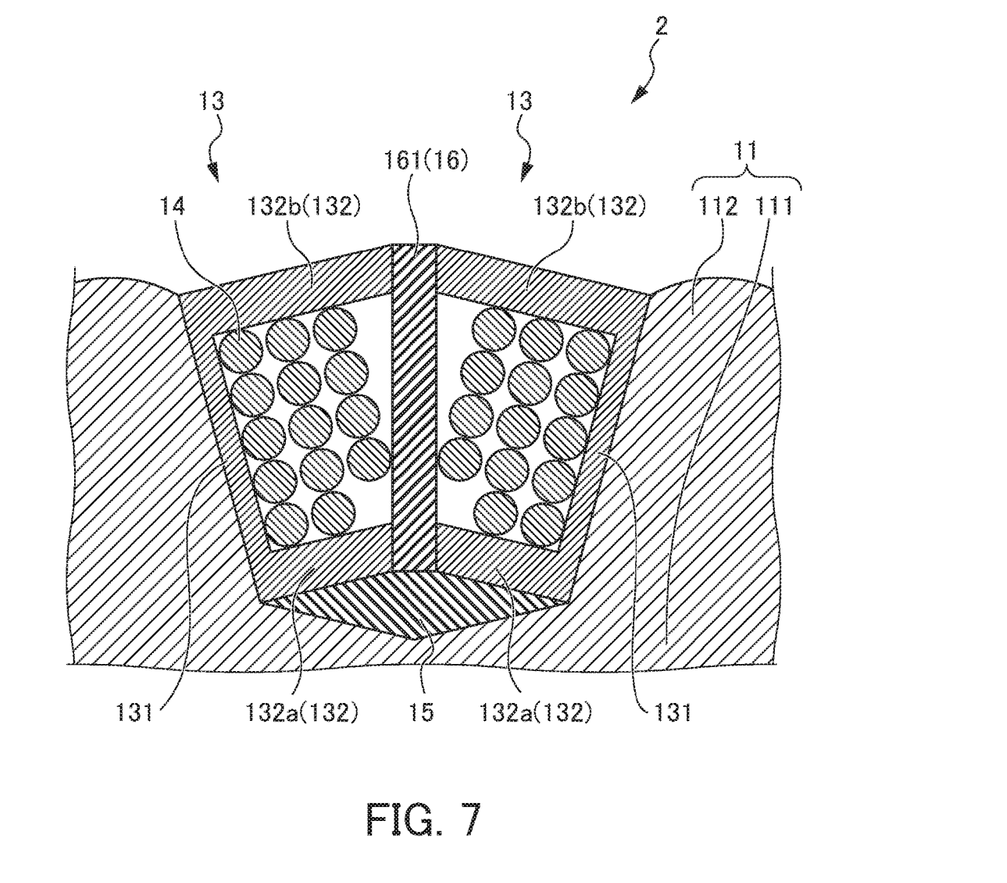
FIG. 7 explains the working effect achieved by the stator according to the second embodiment.

FIG. 7 explains the working effect achieved by the stator 2 according to the second embodiment. As shown in FIG. 7, the presence of the second insulating member 16 (interphase insulating part 161) restricts move of the winding 14 to reduce the probability of contact between windings 14 of different phases during injection molding of the stator 2.

This embodiment achieves the following effect in addition to the above-described effects achieved by the first embodiment. According to this embodiment, the multiple interphase insulating parts 161 are further provided. Each of the interphase insulating parts 161 is fitted in a gap formed between adjacent bobbins 13 and electrically insulates windings 14 of different phases wound around the adjacent bobbins 13. Thus, as described above, move of the winding 14 to be caused by application of injection pressure is restricted to further reduce the probability of contact between the windings 14 of different phases.

According to this embodiment, the multiple interphase insulating parts 161 are formed as an integrated part. Thus, the interphase insulating parts 161 can be inserted in a single process, thereby achieving reduction in man-hours.

The present invention is not limited to the above-described embodiments, and modifications, improvements, etc. can be covered by the present invention as long as such modifications, improvements, etc. are in a range that achieves the purpose of the present invention.

EXPLANATION OF REFERENCE NUMERALS 1, 2 Stator
11 Teeth unit
12 External unit
13 Bobbin
14 Winding
15 First insulating part
16 Second insulating member
111 Circular cylindrical part
112 Projection part
133 Hollow section
161 Interphase insulating part (second insulating part)
C, Ca, Cb Gap

What is claimed is:

1. A stator of a motor comprising:
   a teeth unit with a circular cylindrical part having a circular cylindrical shape and multiple projection parts spaced uniformly along an outer circumference of the circular cylindrical part in a circumferential direction of the circular cylindrical part, the projection parts projecting radially outwardly from the circular cylindrical part;
   multiple bobbins each having:
      a cylindrical shaped-part including a hollow section through which a projection part of the multiple projection parts is passed to be fitted, and an outer periphery around which windings are wound; and
      a radially innermost part having a surface facing the circular cylindrical part;
   a cylindrical external unit arranged radially outside the teeth unit and fitted to an outer circumference of the teeth unit and the outer peripheries of the bobbins; and
   multiple first insulating parts arranged to fill gaps between the circular cylindrical part of the teeth unit and the bobbins and electrically insulating the teeth unit and the windings, wherein
   each first insulating part of the multiple first insulating parts has at least one circumferentially extending portion that radially faces the radially innermost part of the bobbin.

2. The stator of a motor according to claim 1, wherein the multiple first insulating parts are integrated with the teeth unit.

3. The stator of a motor according to claim 1, further comprising multiple second insulating parts each arranged to be fitted in a gap formed between adjacent ones of the bobbins and electrically insulating windings of different phases wound around the adjacent bobbins.

4. The stator of a motor according to claim 2, further comprising multiple second insulating parts each arranged to be fitted in a gap formed between adjacent ones of the bobbins and electrically insulating windings of different phases wound around the adjacent bobbins.

5. The stator of a motor according to claim 3, wherein the multiple second insulating parts are integrated.

6. The stator of a motor according to claim 4, wherein the multiple second insulating parts are integrated.

* * * * *